US012512959B2

(12) United States Patent
Pittaluga et al.

(10) Patent No.: US 12,512,959 B2
(45) Date of Patent: Dec. 30, 2025

(54) OPTICAL ENCRYPTION CAMERA

(71) Applicant: NEC Laboratories America, Inc., Princeton, NJ (US)

(72) Inventors: Francesco Pittaluga, Los Angeles, CA (US); Xiang Yu, Mountain View, CA (US); Salman Khan, San Jose, CA (US)

(73) Assignee: NEC Corporation, Tokyo (JP)

( * ) Notice: Subject to any disclaimer, the term of this patent is extended or adjusted under 35 U.S.C. 154(b) by 72 days.

(21) Appl. No.: 18/498,677

(22) Filed: Oct. 31, 2023

(65) Prior Publication Data
US 2024/0154784 A1 May 9, 2024

Related U.S. Application Data

(60) Provisional application No. 63/460,056, filed on Apr. 18, 2023, provisional application No. 63/423,077, filed on Nov. 7, 2022, provisional application No. 63/423,076, filed on Nov. 7, 2022, provisional application No. 63/421,674, filed on Nov. 2, 2022.

(51) Int. Cl.
H04L 9/00 (2022.01)
G06F 21/60 (2013.01)
G06V 40/16 (2022.01)
H04L 9/08 (2006.01)
H04N 25/10 (2023.01)

(52) U.S. Cl.
CPC ............ H04L 9/002 (2013.01); G06F 21/602 (2013.01); G06V 40/172 (2022.01); H04L 9/0869 (2013.01); H04N 25/10 (2023.01)

(58) Field of Classification Search
None
See application file for complete search history.

(56) References Cited

U.S. PATENT DOCUMENTS

2017/0366763 A1* 12/2017 Lin ..................... G01J 3/2823

OTHER PUBLICATIONS

Byrne, J., DeCann, B., & Bloom, S. (Sep. 11, 2020). Key-nets: Optical transformation convolutional networks for privacy preserving vision sensors. arXiv preprint arXiv:2008.04469.

Nguyen Canh, T., & Nagahara, H. (Jun. 15, 2019). Deep compressive sensing for visual privacy protection in flatcam imaging. In Proceedings of the IEEE/CVF International Conference on Computer Vision Workshops (pp. 0-0).

Ishii, Y., Sato, S., & Yamashita, T. (Aug. 23, 2020). Privacy-aware face recognition with lensless multi-pinhole camera. In Computer Vision—ECCV 2020 Workshops: Glasgow, UK, Proceedings, Part V 16 (pp. 476-493). Springer International Publishing.

(Continued)

Primary Examiner — Samira Monshi
(74) Attorney, Agent, or Firm — Joseph Kolodka; Vincent Duffy

(57) ABSTRACT

An optical encryption camera includes a sensor array and a filter positioned over the sensor array to receive light prior to the sensor array. The filter includes a multiplexing mask and a scaling mask in sequence. The multiplexing mask and the scaling mask combine to provide an encryption key to encrypt image data prior to capture.

19 Claims, 7 Drawing Sheets

(56) References Cited

OTHER PUBLICATIONS

Liao, M., Zheng, S., Pan, S., Lu, D., He, W., Situ, G., & Peng, X. (May 20, 2021). Deep-learning-based ciphertext-only attack on optical double random phase encryption. Opto-Electronic Advances, 4(5), 200016-1.
Wang, Y., Gawedzinski, J., Pawlowski, M. E., & Tkaczyk, T. S. (Jun. 11, 2018). 3D printed fiber optic faceplates by custom controlled fused deposition modeling. Optics Express, 26(12), 15362-15376.
Wang, Z. W., Vineet, V., Pittaluga, F., Sinha, S. N., Cossairt, O., & Bing Kang, S. (Jun. 15, 2019). Privacy-preserving action recognition using coded aperture videos. In Proceedings of the IEEE/CVF Conference on Computer Vision and Pattern Recognition Workshops (pp. 0-0).
Liao, M., He, W., Lu, D., & Peng, X. (Jan. 31, 2017). Ciphertext-only attack on optical cryptosystem with spatially incoherent illumination: from the view of imaging through scattering medium. Scientific Reports, 7(1), 41789.
Refregier, P., & Javidi, B. (Apr. 1, 1995). Optical image encryption based on input plane and Fourier plane random encoding. Optics letters, 20(7), 767-769.
Zang, J., Xie, Z., & Zhang, Y. (Apr. 15, 2013). Optical image encryption with spatially incoherent illumination. Optics letters, 38(8), 1289-1291.

\* cited by examiner

OPTICAL ENCRYPTION CAMERA

RELATED APPLICATION INFORMATION

This application claims priority to provisional applications 63/421,674 filed Nov. 2, 2022, 63/423,076, filed on Nov. 7, 2022, 63/423,077 filed on Nov. 7, 2022, and 63/460,056 filed Apr. 18, 2023, all incorporated herein by reference in their entirety.

BACKGROUND

Technical Field

The present invention relates to optical encryption and more particularly to systems, devices and methods for encrypting image information before capturing an image.

Description of the Related Art

As camera-based technologies become increasingly integrated, the risk of sensitive visual data being compromised is also increasing. A standard approach for attenuating this risk is to apply software or hardware-based cryptographic methods to sensitive visual data, after image capture. However, such methods are still susceptible to data sniffing attacks that gain access to the sensitive data prior to it being encrypted.

SUMMARY

According to an aspect of the present invention, an optical encryption camera includes a sensor array and a filter positioned over the sensor array to receive light prior to the sensor array. The filter includes a multiplexing mask and a scaling mask in sequence. The multiplexing mask and the scaling mask combine to provide an encryption key to encrypt image data prior to capture.

According to another aspect of the present invention, a method for optical encryption includes encrypting an image, by an optical encryption camera, by applying a multiplexing mask to the image and applying a scaling mask to the image to provide an encrypted image. The encrypted image is received on a sensor array wherein the multiplexing mask and the scaling mask combine to provide an encryption key to encrypt image data prior to capture. The encrypted image is stored.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
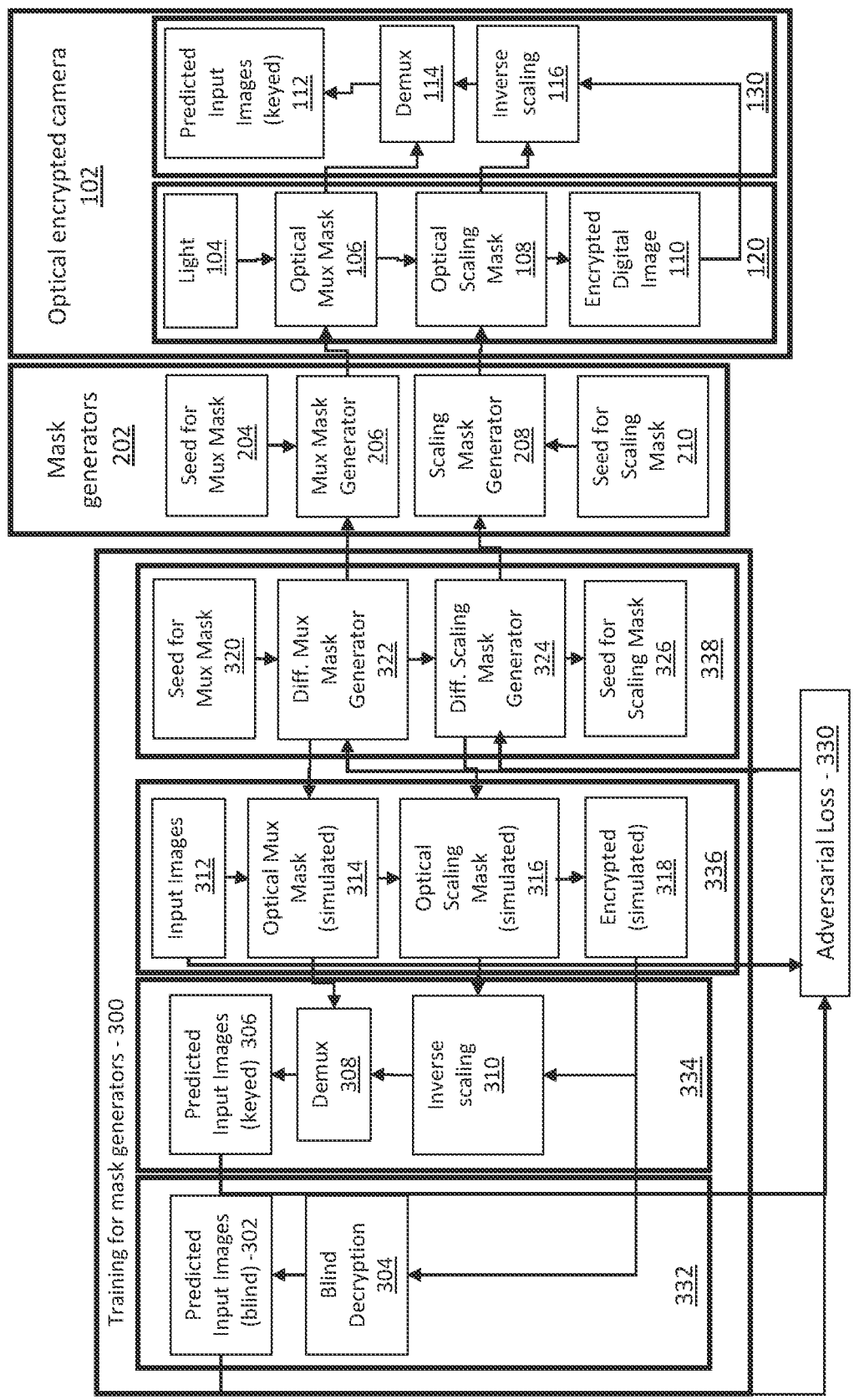
FIG. 1 is a block/flow diagram illustrating an optical encryption camera coupled to a mask generation module and a training module for mask generators, in accordance with an embodiment of the present invention.

In accordance with embodiments of the present invention, systems, devices and methods are provided to prevent gaining access to sensitive data by encrypting sensitive visual data prior to image capture, via optical coding of an incident light-field (incoherent light). In one embodiment, the image capture also enables high quality software-based keyed decryption.

In useful embodiments, optical encryption cameras can include cameras with computational capabilities to encrypt image data prior to image capture. This can be performed via optical coding of the incident light-field. Recovery of unencrypted image data is possible only if access to a camera's encryption key is provided, which is defined by the unique optical elements of each camera. In useful embodiments of the present invention, a camera includes a bare sensor array with an optical scaling mask positioned flush against the sensor pixels and an optical multiplexing mask positioned a short distance (e.g., a few millimeters) above the scaling mask. Coupling the camera with algorithms for generating unique optical masks produces images with desirable security and imaging properties, including high-quality-calibration free keyed decryption and robustness against a range of attacks, including blind decryption attacks and point-spread-function estimation attacks that exploit bright illumination sources in a scene.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for optical encryption is illustratively depicted in accordance with one embodiment of the present invention. An optical encryption camera 102 is shown in accordance with one embodiment. The optical encryption camera 102 is coupled to a mask generator module 202 and a training module for mask generators 300. In use, after the optical encryption camera 102 has been trained, the optical encryption camera 102 can be detached from modules 202 and 300. The mask generator module 202 and the training module for mask generators 300 can be stored in memory of a computer device (a portable computer, cellphone, laptop, etc.) or may be implemented as a dedicated computer hardware device.

The optical encryption camera 102 includes two modules. These modules include a sensing module 120 and a decryption module 130. The sensing module 120 directly captures an encrypted image 110 via optical multiplexing 106 and optical scaling 108 of an incident light-field 104. The decryption module 130 accepts the encrypted image 110 as input and returns a decrypted image (predicted input image) 112.

The sensing module 120 converts the incident light-field 104 into encrypted measurements via optical computations. The module 120 includes a bare sensor array with an optical scaling mask 108 positioned flush against the sensor array and an optical multiplexing mask 106 positioned a short distance (1-5 mm millimeters) above the scaling mask 108. The two masks constitute an "encryption key". Without knowledge of the features of these masks, decryption is not possible.

The decryption module 130 accepts an encrypted image 110 as input and returns a decrypted image 112. Decryption is achieved by applying inverse computations of those applied by the two optical masks 106 and 108. Hence, knowledge of the mask designs is needed for decryption.

A mask generation module 202 is connected between a training algorithm 300 for mask generators and the optical encrypted cameras 102. The mask generation module 202 includes mask generators for multiplexing masks and scaling masks. A multiplexing mask generator 206 accepts random seeds 204 as inputs and outputs a corresponding multiplexing mask to optical multiplexing mask 106. Likewise, a scaling mask generator 208 accepts random seeds 210 as inputs and outputs a corresponding scaling mask for optical scaling mask 108. The mask generators 206 and 208 can be hand-engineered and/or learned algorithms for generating masks. When not learned, uniform noise can be employed as a generation function for the scaling masks, and colored noise as a generation function for the multiplexing masks. Colored noise can be employed to inhibit autocorrelation-based attacks.

A training algorithm 300 for mask generators is connected to the mask generation module 202. The training for the mask generator includes differentiable mask module 338. The training for the mask generator includes instantiating differentiable multiplexing generator 322 and differentiable scaling mask generator 324 with learnable parameters. This includes providing a seed(s) 320 for the multiplexing mask as well as a seed(s) 326 for a scaling mask. Learnable parameters includes pixel values of the scaling and multiplexing masks. These masks may be amplitude or phase masks. For amplitude masks, the pixel values represent the opacity level. For phase masks, the pixel values denote the phase shift.

Next, a simulated optical encryption camera module 336 is generated. This includes generating an optical multiplexing mask 314 and generating an optical scaling mask 316 for the simulated camera. Input images 312 are masked (simulated multiplexing and scaling) to simulate an encrypted digital image 318.

A keyed decryption module 334 provides keyed decryptions of input images 312. A blind decryption module 332 provides blind decryptions of input images 312. A keyed demultiplex 308 is performed after an inverse scaling 310 on the encrypted images 318. A blind decryption 304 is also performed on the encrypted images 318 to recover estimates of input images. The estimates of the input images are predicted input images (blind) 302 and predicted input images (keyed) 306.

The parameters of the mask generators 322 and 324 are updated to minimize and maximize reconstruction error as determined by an adversarial loss function 330 for the keyed decryption from module 334 and blind decryption from module 332, respectively. The approach is deemed a success if keyed decryption succeeds and blind decryption fails. The outputs of the training algorithm 300 are learned parameters of the mask generators 322 and 324. These learned parameters can be employed by the mask generator module 202, which in turn can be employed in the optical encryption camera 102.

The differentiable mask module 338 includes learnable mask generators 322 and 324. The generators 322 and 324 can be modeled as deep learning neural networks to optimize camara parameters. The parameters of the neural networks are updated to minimize and maximize the reconstruction error for the keyed and blind decryption processes, respectively.

The simulated optical encryption camera module 336 can employ Fourier optics to simulate the optical multiplexing (314) and scaling (316) due to the respective optical masks. Blind decryption in module 332 can be modeled as a deep learning neural network and be learned in tandem with the learnable mask generators 322 and 324, or a conventional blind deconvolution algorithm can be employed.

A two mask design in accordance with the present invention makes blind decryption more challenging by enlarging the key-space, and inhibits mask estimation attacks that exploit bright illumination sources in the scene. With a single multiplexing mask, bright illumination sources will reveal the mask, but with two masks, neither mask is revealed.

Learned and hand-engineered optical encryption masks generated in accordance with embodiments of the present invention improve image security compared to existing approaches. By using colored noise to generate the multiplexing masks, autocorrelation attacks are inhibited. By employing learning for the mask generators, the present embodiments learn to produce masks that inhibit an even wider range of attacks.

Figure 2:
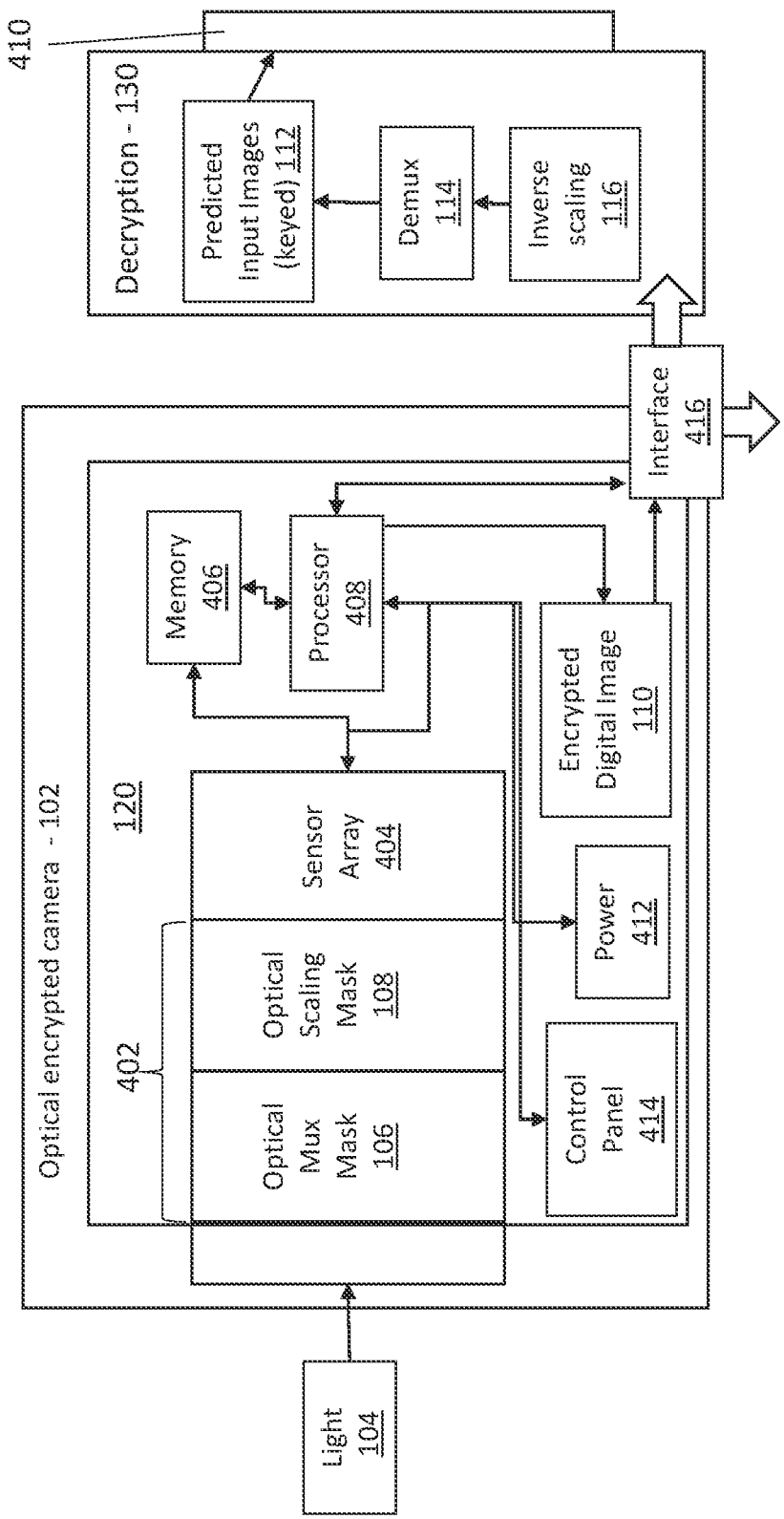
FIG. 2 is a block diagram illustrating an optical encryption camera with a connectable decryption module connected to the camera, in accordance with an embodiment of the present invention.

Referring to FIG. 2, a block diagram showing greater detail for a lensless computational camera 102 that encrypts image data before or during image capture is depicted in accordance with one embodiment. Camera 102 receives an incident light-field light through an optical filter 402. The optical filter 402 includes two masks, which filter light in accordance with an optical multiplexing mask 106 and an optical scaling mask 108 before the incident light falls incident on a sensor array 404. Sensor array 404 can include any suitable image capturing device. In one embodiment, the sensor array 404 includes an integrated circuit chip or chips configured with light sensors for capturing light output from the optical filter 402. The masks of the optical filter 402 are programmable and can include mask features and designs that are stored in the mask itself or stored in memory 406. A hardware processor 408 interacts with memory 406, sensor array 404, masks 106 and 108 to control operations of the camera 102. The camera 102 can include a power source 412 to power the functions of the camera 102. The power source 412 can be a fixed or portable source, as needed. A control panel 414 can be provided to enable interactions with the camera 102 including programming, image capture, storage command and guidance, etc.

The camera 102 also includes an interface 416 that can include a wired or wireless connection port. The interface 416 can permit uploading and downloading commands and data to and from the camera 102 either wired or wirelessly. In one embodiment, the masks 106, 108 can be updated for each image capture process so that each image includes a unique encryption. In another embodiment, encryption remains constant until an update of the mask 106 and 108 is requested.

In one embodiment, incoherent optical encryption including a randomly generated amplitude mask can be employed for the scaling mask 108 and a randomly generated phase mask can be employed for the multiplexing mask 106. The masks 106 and 108 have their features modified in accordance with learned parameters. The learned parameters can be learned using the training mask generators 300 that are trained to be resistant to specific attacks. The parameters learned can be used to bias the mask designs to be particularly resistant to a range of attacks to generate optical encryption masks with greater robustness against the range of attacks.

Image reconstruction in accordance with the present embodiments employs both regularized least squares and deep learning-based reconstruction methods. Since optical elements behave as linear operators, optical encryption cameras will always be susceptible to chosen plaintext attacks in which an attacker uses a large set of ciphertext-plaintext pairs to estimate the encryption function. This limits the practical use of optical encryption cameras to settings where attackers lack physical access to the camera location. Accordingly, attackers usually do not have physical access to the camera locations, but can access a camera's stream. In other words, attackers have access to ciphertexts (measurements) from a camera, but not their corresponding plaintext (raw images), except for three special cases. This is a reasonable assumption for many settings, such as security cameras in homes and offices.

Four types of attacks are illustratively considered: ciphertext only attacks (COA) and three special cases of known plaintext attacks, namely, impulse known plaintext attack (I-KPA), uniform known plaintext attack (U-KPA), and uniform-impulse known plaintext attack (UI-KPA). Bright impulse-like illumination sources and uniform backgrounds often appear naturally in scenes and may be recognizable in the corresponding encrypted sensor measurement. Hence, attackers may gain access to an approximate impulse or uniform response of the sensor, without having physical access to the sensor.

Let $C: \mathbb{R}^{W_1 \times H_1 \times 3} \times \mathbb{R}^{W_2 \times H_2 \times M} \to \mathbb{R}^{W_2 \times H_2 \times 3}$ denote an optical encryption camera that maps a plaintext (scene) $X \in \mathbb{R}^{W_1 \times H_1 \times 3}$ and key $K \in \mathbb{R}^{W_2 \times H_2 \times M}$ to the ciphertext (measurement) $Y = C(K, X)$. The goal of an attacker is to recover the plaintext X from ciphertext Y with knowledge of function C, but partial or no knowledge of key K. For each of the four attack types, a Dense Prediction Transformer (DPT) D is trained to learn the inverse mapping from $B = \{Y, \hat{X}, \hat{K}\}$ for arbitrary key K to the corresponding plaintext X, where Y denotes a single cipherext, $\hat{X}$ an estimate of the plaintext, and $\hat{K}$ an estimate of the key. For the COA, no estimates $\hat{X}$ and $\hat{K}$ are available, so B reduces to Y. For the KPAs, the methods for estimating $\hat{X}$ and $\hat{K}$ depend on the design of the targeted optical encryption camera.

To train D, a random key is generated for each ciphertext sample in each batch and use a loss consisting of a combination of an L1 pixel loss and an L2 perceptual loss over the outputs of rectified linear unit (relu) layers: relu 1_1, relu 2_2, and relu 3_3 of data pre-trained for image classification on the ImageNet dataset. Concretely, the loss is given by:

$$\mathcal{L}_D = w_1 \|D(B) - X\|_1 + w_2 \Sigma_{i=1}^{3} \|\phi_i(D(B)) - \phi_i(X)\|_2^2,$$

where $$w_1 = 0.5, \, w_2 = 1.2, \text{ and } \phi_1: \mathbb{R}^{H \times W \times 3} \to \mathbb{R}^{\frac{H}{2} \times \frac{W}{2} \times 64},$$

$$\phi_2: \mathbb{R}^{H \times W \times 3} \to \mathbb{R}^{\frac{H}{4} \times \frac{W}{4} \times 128}, \text{ and } \phi_3: \mathbb{R}^{H \times W \times 3} \to \mathbb{R}^{4 \times \_ * 256}$$

denote the layers relu 1_1, relu 2_2, and relu3_3, respectively, of a pre-trained network, e.g., VGG16.

The double-mask sensor design of optical encrypted camera 102 has two co-axially placed masks—an optical scaling mask 108 is $S \in \mathbb{R}^{W_1 \times H_1 \times 3}$ positioned flush against the sensor array 404 and an optical multiplexing mask 106 positioned a few millimeters above the scaling mask 108. The scaling mask 108 can be implemented via an amplitude mask. For the multiplexing mask 106, an amplitude or phase mask can be used, as described (e.g., C).

Let $P \in \mathbb{R}^{W_2 \times H_2 \times 3}$ denote the point-spread-function (PSF) produced by the multiplexing mask 106. Then, P and S constitute the "encryption key" of the system, and the encrypted measurements $Y \in \mathbb{R}^{W_2 \times H_2 \times 3}$ captured by the sensor are given by $Y = S \cdot (P * X) + N$, where $X \in \mathbb{R}^{W_1 \times H_1 \times 3}$ denotes the scene and $N \in \mathbb{R}^{W_1 \times H_1 \times a}$ the sensor noise. It should be noted again that * represents a full-sized convolution with zero-padded boundary conditions similar to the model used in existing thin lensless cameras.

Compared to single-mask lensless designs, the double-mask design in accordance with present embodiments has a larger key space, which makes decryption attacks more challenging, and also inhibits impulse and uniform known plain text attacks. For the single mask design, the encryption key (i.e., PSF P) is equal to the impulse response of the camera, so the IKPA completely compromises the system. This is not the case for the double-mask design, as the scaling mask makes the system shift-variant, so the impulse response only reveals the "effective" encryption key for a single scene pixel.

Imaging a uniform scene or a Uniform Scene Response (USR) can be employed because of the structure of a forward imaging model, as in the present embodiments. However, scenes like a plain wall can reveal the scaling mask S up to a scale. For a uniform scene to reveal the scaling mask S, P*X, it must also be uniform. However, due to full-sized, linear convolution with zero-padded boundary conditions, P*X is never uniform, even for a plain wall scene. Therefore, it is not possible to reveal S from a USR.

For optical encryption cameras, the design of the masks is an important consideration for good performance, i.e., for enabling high-quality keyed decryption while also thwarting decryption attacks. The mask should have the following desirable properties: 1) PSF should contain directional filters for all angles to enable high-quality lensless reconstruction; 2) The autocorrelation of the PSF should not be an impulse. The PSFs for which the autocorrelation is an impulse, are susceptible to autocorrelation-based COAs. These attacks exploit the fact that taking the autocorrelation of encoded measurements eliminates the mask component if the autocorrelation of the PSF is an impulse. This reduces the COA problem to recovering an image from its autocorrelation. 3) The PSF produced by the multiplexing mask should not be binary. Binary PSFs may be revealed to an attacker when a point source appears in the scene. Although the double-mask design in accordance with present embodiments provides protection against such attacks, it is still not desirable for the PSF to be compromised, as it reduces the key size significantly.

Consider a one-dimensional case of binary PSF p, and positive scaling mask s. The measurement y(n) recorded at the sensor due to a single point source is given by:

$$y(n) = \begin{cases} s(n) & \text{if } n \in \mathcal{J} \\ 0, & \text{otherwise} \end{cases},$$

where $\mathcal{J}$ is the set of all pixel locations for which p(n) is 1. Simple thresholding of y, i.e., y>0, reveals p and reduces the size of the key.

The PSF due to multiplexing mask 106 can be given by, $P=\alpha P_{colr}+(1-\alpha)P_{cont}$, where $P_{cont}$ is a binary contour PSF obtained from Perlin noise, $P_{colr}$ is a colored noise with certain roll-off. Perlin contours are known for high-quality lensless imaging but have impulse-like autocorrelations. On the hand, $P_{colr}$ is smoother and has non-impulse autocorrelation with varying roll-off. The Perlin feature size is fixed, the permutation vector for Perlin noise is randomized, and correspondingly the contour is PSF $P_{cont}$. The length of the permutation vector is the same as the height or width of the PSF. To generate $P_{colr}$, colored noise is generated with Power Spectral Density (PSD) given by, e.g.:

$$H_\beta(u, v) = \frac{1}{(u^2 + v^2)^{\left(\frac{\beta}{2}\right)}},$$

where $H_\beta(u,v)$ is the Fourier transform of the PSF.

The corresponding colored noise $P_{colr}(\beta)$ is given by, $P_{colr}(\beta)=\mathcal{F}^{-1}(\sqrt{H_\beta}e^{j\theta})$. Here, $\mathcal{F}^{-1}$ is the inverse fast Fourier transform (FFT), θ is random white noise (e.g., sampled from $\mathcal{U}(0,1)$) and β is a scalar hyper-parameter that controls the roll-off of the colored noise. β is randomly sampled from white noise (e.g., $\mathcal{U}(1,10)$). The linear combination co-efficient α is chosen uniformly at random. Also, it should also be noted that PSF needs to be non-negative as light cannot be subtracted.

For the scaling mask 108 (S), colored noise is employed again without the Perlin contours. For a given pair of (S,P), the color of the noise (β) is the same for both S and $P_{aoir}$ to avoid attacks due to filtering of either component. It should be noted that S has to be positive as we do not want to throw information from any of the sensor pixels.

The performance of two different multiplexing mask designs can be compared under autocorrelation-based ciphertext-only attack. The mask designs being compared are (a) $P_O=\alpha P_{colr}+(1-\alpha)P_{cont}$, (b) $P_W=\alpha P_{whtt}+(1-\alpha)P_{cont}$, where $P_{white}$ is white noise PSF with impulse autocorrelation. $P_O$ is a design in accordance with one embodiment while $P_W$ is a corresponding version with white noise used instead of colored noise for PSF.

Given, that the autocorrelation of $P_W$ is close to an impulse (because autocorrelations of $P_{whtte}$ and $P_{cont}$ are impulse), it is possible to reconstruct the underlying scene from the autocorrelation of the measurement for $P_W$, while this is not the case for $P_O$ in accordance with embodiments of the present invention.

The decryption module 130 accepts three inputs, an encrypted image Y, a scaling mask S, and a PSF P due to the multiplexing mask M; and returns a decrypted image $\hat{X}$. For an ideal system, decryption can be achieved by simply applying the inverse of the two optical computations. However, in practice, to account for noise, cropping, and imperfect calibration, we instead employ a double-step estimation process to recover the scene X. In the first step, we employ Tikhonov regularized least squares to recover an initial estimate $\hat{X}_T$ of image X:

$$\hat{X}_T = \underset{X}{\text{argmin}}\|Y_N - P*X\| + \gamma\|X\|_F^2.$$

Here $Y_N$ is the measurement after scaling normalization i.e.

$$Y_N = \frac{Y}{S+\varepsilon}\cdot\hat{X}_T$$

has a closed-form solution and can be implemented in the Fourier domain as Wiener filtering.

In the second step, an initial estimate $X_T$ plus measurement Y, and multiplexing mask PSF P are fed to a Dense Prediction Transformer (DPT), $D:\mathbb{R}^{W_1 \times H_1 \times 7} \to \mathbb{R}^{W_1 \times H_1 \times 3}$, which is trained via stochastic gradient descent to produce a refined version $\hat{x}$, given input $B=\{Y,\hat{X}_T,P\}$. As with $\mathcal{L}_D$ loss above, we use a combination of $\mathcal{L}_1$ loss and VGG feature loss to learn the mapping with $w_1=0.5$ and $w_2=1.2$. This transformer-based refinement performed slightly better than the U-Net-based refinement typically used in lensless imaging.

In one embodiment, mask generator module 202 (FIG. 1) can be stored in memory 406 of the camera 102. Mask generator module 202 can generate scaling and multiplexing masks for the camera 102 in real-time or the masks can be generated and stored until updated. In one embodiment, mask generation is performed using a mask generation function or functions (MGF). MGF is a cryptographic primitive similar to a cryptographic hash function. A mask is defined for an array of pixels tiled or replicated over the entire image.

The encrypted digital image 110 can be output directly in digital form or it can be input to a decryption module 130 which can be part of the camera 102 or can be stored in a separate memory. In one mode, the camera 102 can be employed with a decryption module 130. The decryption module 130 can include a display 410. Alternately, the decryption module 130 can be employed in a separate computing/processing device having a its own display. The camera 102 can capture an image which can be viewed on the display 410 only if proper permission is provided. In other words, the decryption steps including inverse scaling 116 and demultiplexing 114 can be performed. To perform inverse scaling 116 and demultiplexing 114, the encryption key provided in accordance with the optical multiplexing mask 106 and optical scaling mask 108 needs to be accessible/known.

In another mode, the camera 102 can be employed to output and store the encrypted image 110. The encrypted image 110 can be sent in its encrypted form for storage and use independent of the camera 102. In one example, sensitive photographs, e.g., of confidential information can remain protected from the time the image is captured until it is properly decrypted without ever being stored in a non-encrypted state.

The encrypted image 110 remains protected from cyber-attacks and other security risks since the filters 402 includes masks 106 and 108 that have been optimized (e.g., trained using artificial intelligence) to be particularly resistant to a range of possible cyber-attacks. The decryption module 130 can include a display 410. Alternately, the decryption module 130 can be employed in a separate computing/processing device having a its own display. The camera 102 can capture an image (light 104) which can be viewed on the display 410 only if proper permission is provided. In other words, the decryption steps including inverse scaling 116 and demultiplexing 114 can be performed. To perform inverse scaling 116 and demultiplexing 114, the encryption key provided in accordance with the optical multiplexing mask 106 and optical scaling mask 108 needs to be accessible/known.

Figure 3:
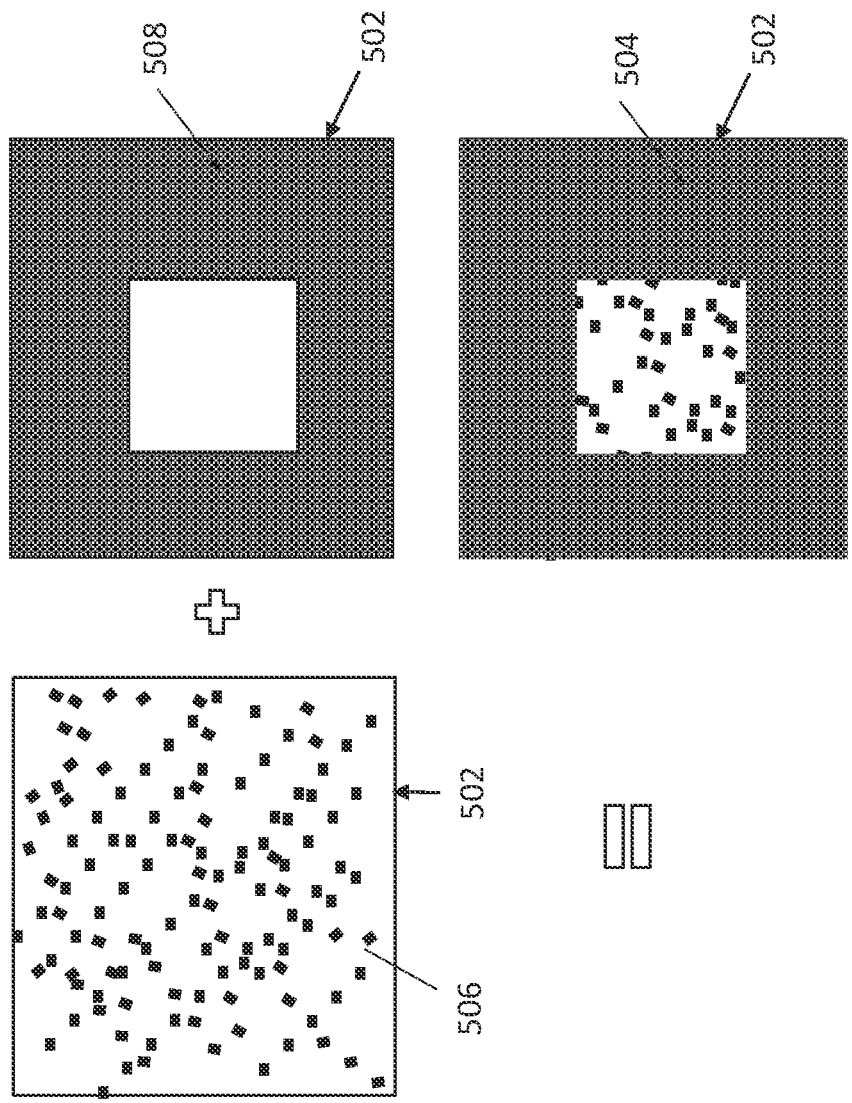
FIG. 3 shows a multiplexing and a scaling mask combining to provide a composite mask image, in accordance with an embodiment of the present invention.

Referring to FIG. 3, a multiplexing mask 506 and a scaling mask 108 are illustratively depicted. If a frame 502 is captured and filtered through the multiplexing mask 506 and scaling mask 108, a combined masked image 504 results. Multiplexing mask 506 includes a randomized/multiplexed pattern for pixel masking while scaling mask 108 blocks out a randomized portion of an image. The types and features of the multiplexing mask 506 and scaling mask 108 can be learned and optimized for a particular cyber-attack or a range of cyber-attacks. The optimization includes masks 106 and 108 in accordance with a loss function using a deep neural network that employs training data from images that have been filtered by different techniques to determine parameters that are updated to minimize and maximize reconstruction error as determined by an adversarial loss function 330 (FIG. 1) for the keyed decryption and blind decryption. The parameters of the neural networks are updated to minimize and maximize reconstruction error for the keyed and blind decryption processes, respectively. The approach is deemed a success if keyed decryption succeeds and blind decryption fails.

The two mask design in accordance with the present invention makes blind decryption more challenging by enlarging the key-space, and inhibits mask estimation attacks that exploit bright illumination sources in the scene. With a single multiplexing mask, bright illumination sources will reveal the mask, but with two masks, neither mask is revealed.

Figure 4:
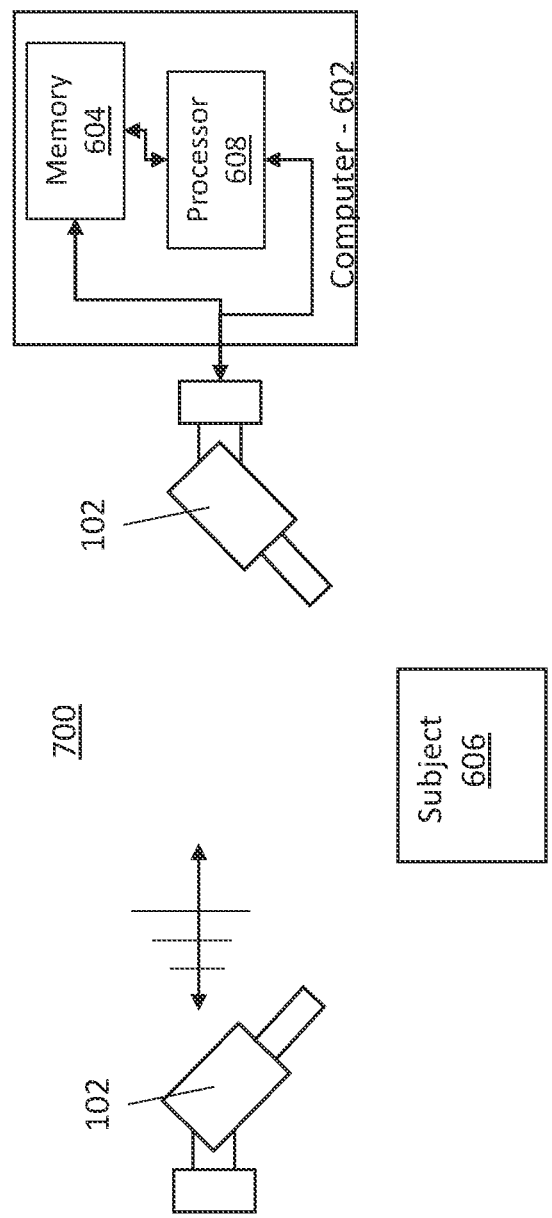
FIG. 4 is a block diagram showing a surveillance system using optical encryption cameras, in accordance with an embodiment of the present invention.

Referring to FIG. 4, a camera system 600 is shown in accordance with an embodiment of the present invention. Camera system 600 includes one or more optical encryption cameras 102. Cameras 102 can be mounted to towers, buildings or any other stable position. Cameras 102 can also be mounted on mobile platforms, such as trucks, planes, drones, cars, etc. Cameras 102 can be hardwired or employ wireless connections for collecting images captured by the cameras 102.

Cameras 102 can be employed in a surveillance capacity, be used to monitor a location or object 606 or be employed to capture images in a particular environment or situation. Images captured by cameras 102 may include sensitive information. Therefore, image data can be encrypted at the time the image is captured. There can be a plurality of reasons for encrypting this data, e.g., the image needs to be protected from viewing by unauthorized personnel or other persons who should not be able to view the images captured by cameras 102. In addition, the image data may be of a sensitive nature, e.g., the system 600 is located inside or around a home. The image data should not only be encrypted but should be further resistant to cyber-attack should a computer 602 or device storing the image data in memory 604 become compromised by a cyber-attack.

Figure 5:
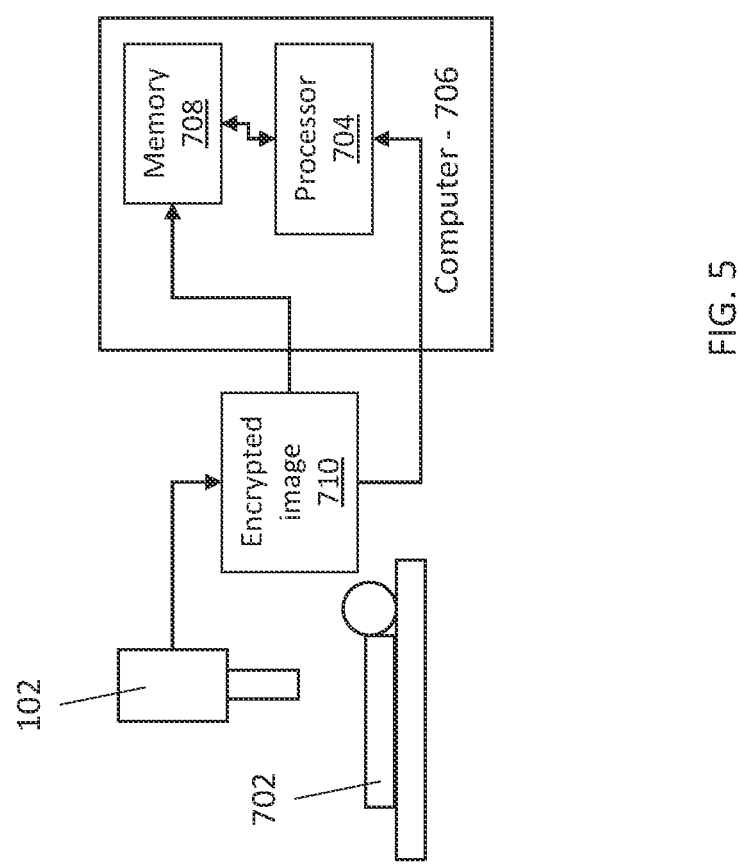
FIG. 5 is a block diagram showing a medical imaging system using optical encryption cameras to maintain sensitive patient data, in accordance with an embodiment of the present invention.

Referring to FIG. 5, a camera system 700 employed in a medical environment protects sensitive image data in accordance with embodiments of the present invention. In a medical environment, medical professionals often need to photograph patients' injuries for documentation purposes or examination purposes. In other situations, photographs are needed to plan surgeries or other treatment programs. These images are sensitive due to their personal nature and due to the doctor-patient relationship. This is particularly true, if the patient's face or other sensitive areas are the subject of the image.

Camera system 700 includes one or more optical encryption cameras 102. Cameras 102 can be mounted to fixed or mobile platforms within a medical facility or can be wielded by medical personal. Cameras 102 can be hardwired or employ wireless connections for collecting images captured by the cameras 102.

Cameras 102 can be employed to capture images of a patient 702 in a medical environment or situation (on location of an accident or other medical emergency. Images captured by cameras 102 may include sensitive information and therefore image data is encrypted at the time the image is captured. The image needs to be protected from viewing by non-medical staff, unauthorized personnel or other persons who should not be able to view the images captured by cameras 102. Because the image data is of a sensitive nature, e.g., medical privacy, the image data should not only be encrypted but should be further resistant to cyber-attack should a computer 706 or device storing the image data in memory 708, such as a medical database or other memory become compromised by a cyber-attack. The medical image can be safely secured and optimized for ease of access for the appropriate personnel.

Figure 6:
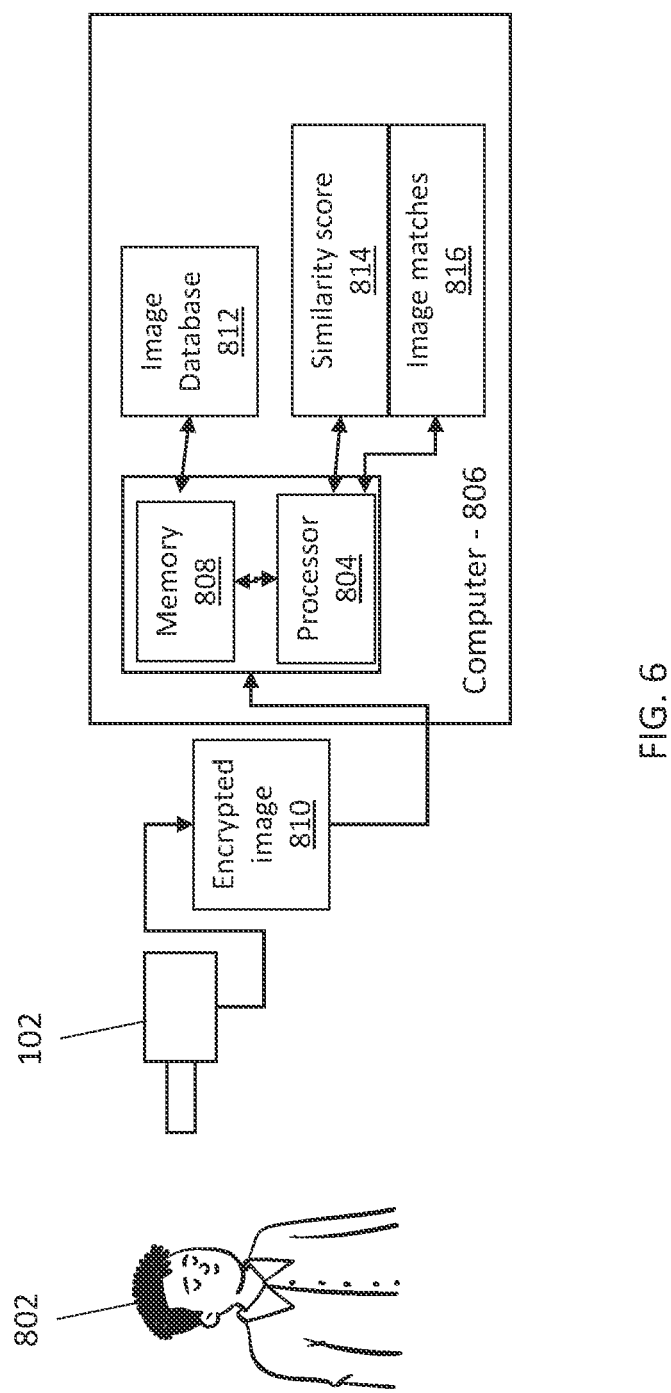
FIG. 6 is a block diagram showing a face recognition system using an optical encryption camera to maintain sensitive biodata, in accordance with an embodiment of the present invention.

Referring to FIG. 6, in another embodiment, a face recognition application is employed with an optical encryption camera 102 in accordance with the present invention. An encrypted query image 802 of a human face is captured using the optical encryption camera 102. An encrypted query image 810 is then sent to a computer 806 to perform face recognition. The computer 806 includes a processor 804 and memory 808. The memory 808 can include applications or programs for face recognition.

The computer 806 can perform face recognition directly in the encrypted domain or can first decrypt the query image and then perform face recognition. If recognition is performed in the encrypted domain, the encrypted query image is compared to encrypted images in a reference database 812. Otherwise, the decrypted image is compared to conventional images in the reference database 812. The image data is compared to the images in the reference database to output similarity scores 814 and/or image matches 816. Since the optical encryption camera 102 encrypts image data before image capture, this implementation inhibits data sniffing attacks that seek to gain access to raw image data.

Face recognition can be employed as a security measure for payment applications, health care applications, building or other access applications, etc. The stored image data for facial, retinal or other personal data collection can be maintained in its encrypted state and only be decrypted if the encryption key is known.

Optical encryption in accordance with the present embodiments can employ standard optical masks that are cost-effective and easily mass-produced. The use of an optical scaling mask, e.g., can be employed to apply pixel gains without the need for modification of camera hardware. Lensless imaging can be employed to provide a separable coded aperture mask above the bare sensor array to enable a thin and flat form-factor imaging device, which can simulate a conventional camera by reconstructing conventional images from coded measurements. A coded phase mask can also be employed for improved light efficiency and reconstruction quality. In a useful embodiment a coded optical mask is used to capture coded measurements to enable high-quality reconstruction of images, but also prevent decryption attacks. A second optical scaling mask is positioned flush against the bare sensor array and its mask designs for multiplexing and scaling masks are trained to increase security by making it impossible to discover the underlying image.

Image reconstruction is a core problem in computational imaging, and plays a key role in lensless imaging. Both regularized least squares and deep-learning-based reconstruction methods are employed in accordance with embodiments of the present invention.

Figure 7:
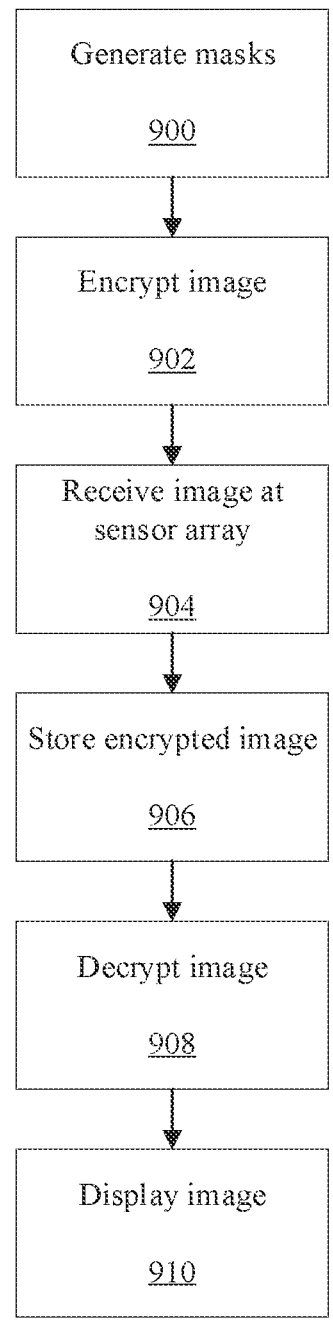
FIG. 7 is a flow diagram showing methods for encrypting an image to protect the image from cyber-attacks, in accordance with an embodiment of the present invention.

Referring to FIG. 7, methods for optical encryption are illustratively shown in accordance with embodiments of the present invention. In block 900, masks are generated for encrypting image data. The multiplexing mask and the scaling mask can be generated using randomly generated seeds, which can be employed for computing the masks using mask generating computations. In one embodiment, the masks can be generated using deep learning neural networks. These networks can employ simulated images to determine the most effective masks to protect images. Parameters for the masks are learned to provide the most robust masks for given threats or a range of threats.

A mask generator training module can be trained by employing keyed and blind simulations of input images to generate masks resistant to a range of cyber-attacks. The mask generator training module can be optimized in accordance with an adversarial loss function, wherein the adversarial loss function is minimized for reconstruction error to measure decryption accuracy and wherein the adversarial loss function is maximized for reconstruction error for blind decryption. The mask generator training module further can include one or more mask generators trained using a deep learning neural network.

In block 902, an image is encrypted, by an optical encryption camera, by applying a multiplexing mask to the image and applying a scaling mask to the image to provide an encrypted image. This encryption is performed before capturing the image on a sensor array within the camera. The optical encryption camera can, e.g., capture medical images including sensitive data, and the sensitive data is stored in memory in an encrypted state. The optical encryption camera can capture face images to perform face recognition using images in an encrypted state. Other applications are also contemplated. It should also be understood that the images can be decrypted and stored in the decrypted (unencrypted state).

In block 904, the encrypted image is received on the sensor array wherein the multiplexing mask and the scaling mask combine to provide an encryption key to encrypt image data prior to capture. In block 906, the encrypted image is stored. This can include storing the image in the camera memory or transmitting the image to a stored image database. The image can be stored in its encrypted state.

In block 908, the captured image can be decrypted using a connectable decryption module by employing inverse operations of the multiplexing mask and the scaling mask. In other embodiments, the decryption model can be provided on the camera itself. In block 910, the decrypted image can be displayed.

Simulation and real-world experiments show that the optical encryption camera is more robust against a range or cyber-attacks. For example, embodiments of the present invention provide resistance against autocorrelation attacks, bright source attacks, transformer based cipher-text attacks, etc.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. An optical encryption camera, comprising:
    a sensor array;
    a filter positioned over the sensor array to receive light prior to the sensor array, the filter including:
        a multiplexing mask and a scaling mask in sequence, the multiplexing mask and the scaling mask combining to provide an encryption key to encrypt image data prior to capture; and
    a mask generator training module to generate masks resistant to a range of cyber-attacks.

2. The optical encryption camera of claim 1, further comprising a connectable decryption module to decrypt encrypted image data by inverse operation of the multiplexing mask and the scaling mask.

3. The optical encryption camera of claim 1, wherein the multiplexing mask and the scaling mask are randomly generated using seeds.

4. The optical encryption camera of claim 1, wherein the mask generator training module is optimized in accordance with an adversarial loss function.

5. The optical encryption camera of claim 4, wherein the adversarial loss function is minimized for reconstruction error to measure decryption accuracy.

6. The optical encryption camera of claim 4, wherein the adversarial loss function is maximized for reconstruction error for blind decryption.

7. The optical encryption camera of claim 1, wherein the mask generator training module further comprises at least one mask generator trained using a deep learning neural network.

8. The optical encryption camera of claim 1, wherein the mask generator training module further comprises a blind decryption module trained using a deep learning neural network.

9. The optical encryption camera of claim 1, wherein the optical encryption camera captures medical images including sensitive data and the sensitive data is stored in memory in an encrypted state.

10. The optical encryption camera of claim 1, wherein the optical encryption camera captures face images to perform face recognition using images in an encrypted state.

11. A method for optical encryption, comprising:
    training a mask generator training module by employing keyed and blind simulations of input images to generate masks resistant to a range of cyber-attacks;
    encrypting an image, by an optical encryption camera, by applying a multiplexing mask to the image and applying a scaling mask to the image to provide an encrypted image;
    receiving the encrypted image on a sensor array wherein the multiplexing mask and the scaling mask combine to provide an encryption key to encrypt image data prior to capture; and
    storing the encrypted image.

12. The method of claim 11, further comprising decrypting the encrypted image to provide a decrypted image using a connectable decryption module by employing inverse operations of the multiplexing mask and the scaling mask.

13. The method of claim 12, further comprising displaying the decrypted image.

14. The method of claim 11, wherein the multiplexing mask and the scaling mask are randomly generated using seeds.

15. The method of claim 11, wherein the mask generator training module is optimized in accordance with an adversarial loss function,
    wherein the adversarial loss function is minimized for reconstruction error to measure decryption accuracy; and
    wherein the adversarial loss function is maximized for reconstruction error for blind decryption.

16. The method of claim 11, wherein the mask generator training module further comprises at least one mask generator trained using a deep learning neural network.

17. The method of claim 11, wherein the optical encryption camera captures medical images including sensitive data and the sensitive data is stored in memory in an encrypted state.

18. The method of claim 11, wherein the optical encryption camera captures face images to perform face recognition using images in an encrypted state.

19. An optical encryption camera, comprising:
a sensor array; and
a filter positioned over the sensor array to receive light prior to the sensor array, the filter including:
a multiplexing mask and a scaling mask in sequence, the multiplexing mask and the scaling mask combining to provide an encryption key to encrypt image data prior to capture, wherein the multiplexing mask and the scaling mask are randomly generated using seeds.

\* \* \* \* \*